United States Patent [19]

Schwanitz et al.

[11] Patent Number: 4,541,663
[45] Date of Patent: Sep. 17, 1985

[54] DAZZLE REDUCING ARRANGEMENT FOR ILLUMINATED SUN VISOR, PARTICULARLY FOR AUTOMOTIVE VEHICLES

[75] Inventors: Konrad Schwanitz, Gevelsberg; Gert Mahler, Radevormwald, both of Fed. Rep. of Germany

[73] Assignee: Gebr. Happich GmbH, Fed. Rep. of Germany

[21] Appl. No.: 495,810

[22] Filed: May 18, 1983

[30] Foreign Application Priority Data

Jun. 12, 1982 [DE] Fed. Rep. of Germany ....... 3222194

[51] Int. Cl.⁴ .............................................. B60J 3/02
[52] U.S. Cl. ................................. 296/97 H; 362/144
[58] Field of Search ........................... 296/97 B, 97 H; 362/144, 135, 142

[56] References Cited

U.S. PATENT DOCUMENTS

| 2,821,620 | 1/1958 | Pavenick | 362/144 |
| 3,032,642 | 5/1962 | Niederman | 362/135 |
| 3,375,364 | 3/1968 | Marcus | 296/97 R |
| 4,421,355 | 12/1983 | Marcus | 296/97 H |

FOREIGN PATENT DOCUMENTS

| 2703447 | 8/1978 | Fed. Rep. of Germany . |
| 2725430 | 11/1978 | Fed. Rep. of Germany . |
| 2730926 | 1/1979 | Fed. Rep. of Germany . |
| 2453042 | 10/1980 | France . |

Primary Examiner—Robert R. Song
Attorney, Agent, or Firm—Ostrolenk, Faber, Gerb & Soffen

[57] ABSTRACT

A sun visor, particularly for automotive vehicles, includes a sun visor body which is equipped with a mirror in which a passenger may view himself and with a source of light for illuminating the passenger. The source of light is positioned above the mirror. The mirror and/or the source of light are swingable with respect to the sun visor body or is supported on respective covers swingable with respect to the sun visor body that the mirror and the source of light are spaced at relatively great vertical distances away from each other in their respective positions of use to thereby reduce dazzling of the viewer due to the source of light.

16 Claims, 7 Drawing Figures

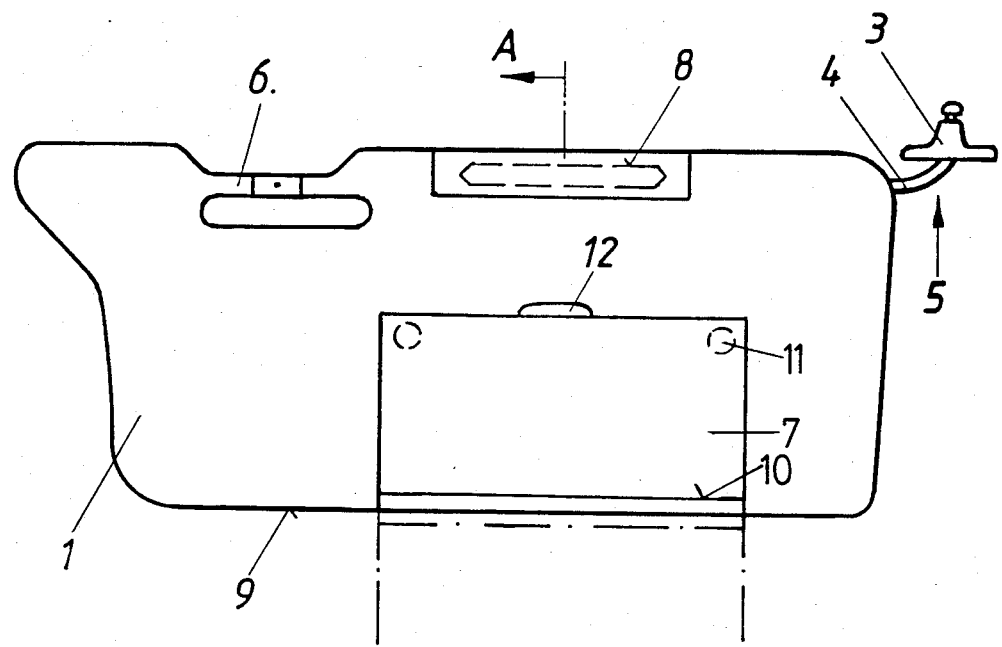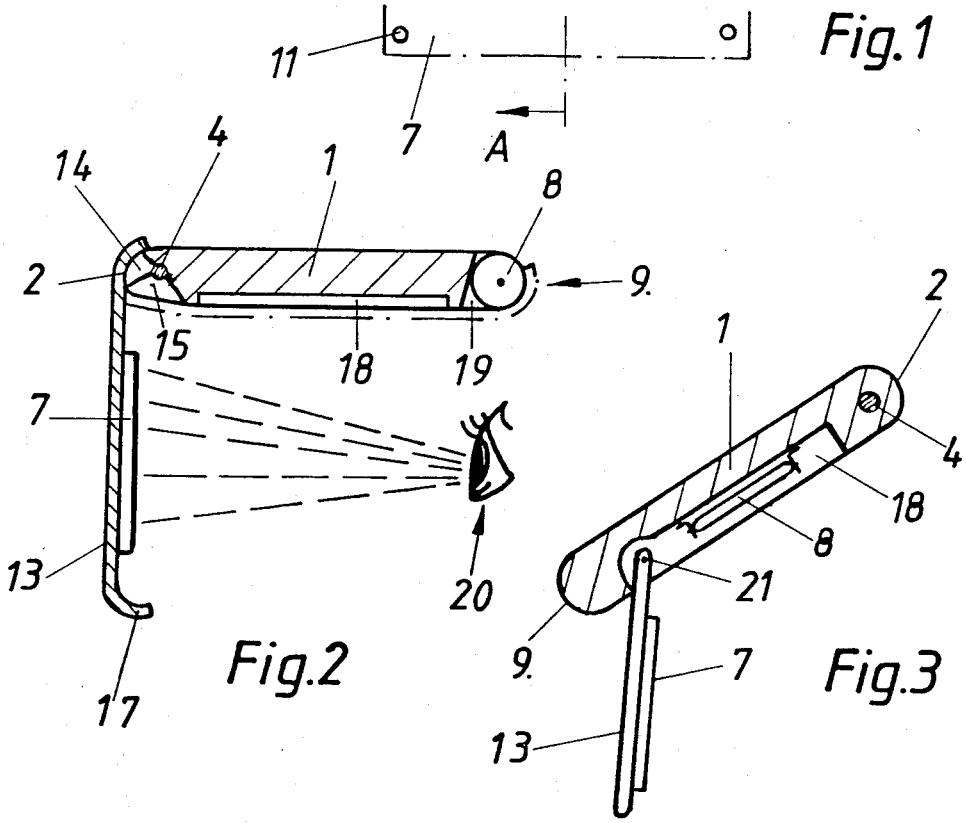

DAZZLE REDUCING ARRANGEMENT FOR ILLUMINATED SUN VISOR, PARTICULARLY FOR AUTOMOTIVE VEHICLES

BACKGROUND OF THE INVENTION

The present invention relates to a sun visor, particularly for automotive vehicles, wherein the sun visor body is provided with a mirror and at least one source of light.

Sun visors, and particularly those used in luxury automobiles, are frequently provided with a mirror and an illuminating device for illuminating the object visible in the mirror. The mirror is predominantly a make-up mirror, and it can be used in the dark because of the presence of an illuminating device. In one sun visor, known from German Patent Application DE-OS No. 27 25 430, corresponding to U.S. Pat. No. 4,203,149, issued May 13, 1980, the mirror within the body of the sun visor is located between two sources of light which flank it on both sides. In another sun visor, known from German Application DE-OS No. 27 30 926, the mirror is seated in a frame which is recessed in the body of the sun visor and the frame is developed so that it is light transmitting and can be illuminated by sources of light behind it. In these known sun visors, it is only possible to reach a compromise with respect to the dazzle caused by the illuminating device. The choices are between increased or reduced brightness of the source of light. With increased brightness, there is sufficient illumination of the face of the person looking into the mirror, but this is obtained at the expense of increased dazzle. On the other hand, if the brightness of the source of light is reduced, the dazzle is decreased. This has the disadvantage of insufficient illumination of the face. Another possibility for adequately illuminating the face with low dazzle is by a corresponding increase in the area of the light-transmitting frame which contains the mirror. But, this would be prevented by structural limitations as to the sun visor body.

SUMMARY OF THE INVENTION

The object of the present invention is to provide a sun visor with a source of light that sufficiently illuminates the face of a person looking into the mirror and which at the same time avoids dazzling him with light.

The sun visor according to the present invention is primarily for use in an automotive vehicle. It includes a sun visor body which in known manner is swivelably mounted at a swivel bearing to the body of the vehicle. The sun visor body supports a mirror in which the passenger can view himself when the mirror is moved to its operational or use position. Also, the sun visor body supports a source of light for illuminating the viewer, so that he can better see himself in the mirror. To avoid dazzling the viewer who is looking into the mirror when the source of light is turned on, the invention contemplates the light source and the mirror being relatively closer to each other when they are in their non-use position, and contemplates their being moved a relatively great distance apart when they are in their use position. In their use position, the mirror is in position to be seen by the viewer and the light source operates to illuminate the viewer. In moving the light source and mirror from their non-use to their use positions, they are relatively moved away from each other, either by movement of the mirror with respect to the sun visor body away from the source of light and/or by movement of the light source with respect to the visor body away from the mirror. Typically, the source of light and the mirror are spaced apart in the vertical direction, with the source of light being disposed above the mirror.

In previous sun visors, close proximity of the mirror and the source of light, in the form of a coherent structural unit, was sought. The present invention proceeds along an entirely different path. Not only are the individual components, consisting of a mirror and a source of light, separated from each other but, in addition, they are movalbe relative to each other on the sun visor body so that there is a large distance between the mirror and the source of light when they are in their positions of use. This has the advantage that the dazzling source of light no longer lies directly in the axis of view. The source of light is preferably positioned above the mirror in the position of use of the mirror. Using the invention, a source of light of relatively high luminous density (which of course should be below absolute dazzle) can be employed. This can also be used to advantage for illuminating the inside of the vehicle.

According to the invention, it is essential to provide as great a distance as possible between the mirror and the source of light. For this purpose, the mirror is supported on the sun visor body such that it can be swung away from the source of light. For accomplishing this, the mirror may be swingably attached on that wide side of the sun visor body which faces the windshield in its position of use. This embodiment makes it possible to leave the sun visor body in its position of non-use, namely against the roof of the car, while the mirror is used by swinging it down.

In an alternate embodiment of the invention, the mirror is swingably attached on that wide side of the sun visor body which in its position of use faces away from the windshield. In this embodiment, therefore, the sun visor body is first swung down by 90°, for instance. The mirror is then swung downward. The path of swing of the mirror amounts to 180°, for instance. The mirror then is opposite the eyes of the viewer in an approximately horizontal direction of viewing, while the source of light is arranged relatively high, as compared with its being seated, for instance, in the region of the longitudinal edge of the sun visor body which coincides with the axis of the sun visor. By the relatvely high arrangement of the source of light, as compared with the mirror, the source of light is, for practical purposes, outside the viewing area of the person looking into the mirror. As a result, dazzle by the source of light is at least extensively prevented.

While the mirror and/or the source of light may be directly carried on the sun visor body, various embodiments of the invention contemplate providing a cover, which is separate from the visor body and which is pivotable to the visor body, and particularly along one horizontal, longitudinal edge, typically its lower edge. The cover is swingable to close over one of the wide area surfaces of the visor body or swingable open away from that surface of the visor body. The mirror or the light source is carried on the cover while the other of these two elements is carried on the visor body, whereby the swinging of the mirror or of the light source is accomplished by the swinging movement of the cover to which it is attached.

The light source should not be continuously on, but is preferably turned on when the mirror and source of light are in their use positions. To this end, a switch is connected to the source of light and to the movable one of the mirror and the source of light and/or to the swingable cover on which that movable element is mounted so that the movement of the mirror and/or the source of light to their use positions causes the source of light to be turned on.

In a further embodiment of the invention, the mirror is disposed in a recess wholly enclosed within the sun visor body and access to that recess is through a slot opening at the longitudinal edge of the visor body. The mirror is moved to its use position by beind drawn out of the recess through the slot opening.

Illustrative examples of the invention will be explained below with reference to the accompanying drawings.

BRIEF DESCRIPTION OF THE DRAWINGS

FIG. 1 is an elevational view of a first embodiment of a sun visor provided with a mirror and source of light according to the invention; and FIGS. 2-7 show further embodiments of the sun visor, in each case shown in cross-section approximately along the section line A—A of FIG. 1.

DESCRIPTION OF THE PREFERRED EMBODIMENTS

Figure 4:
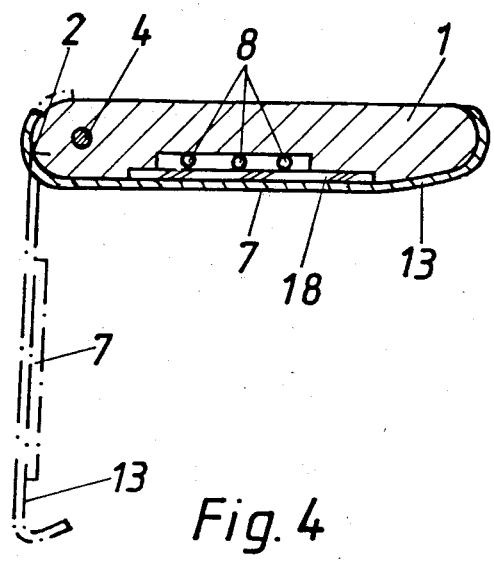

The sun visor shown in all of the drawings in each embodiment comprises a sun visor body 1 with a swivel bearing 5 arranged at one end region of the upper longitudinal edge 2 of the visor body. The bearing 5 is formed of housing 3 and sun visor shaft 4. There is an outer support shaft 6 arranged in the region of the other end of the upper edge of the visor body. The shaft 6 is adapted to be removably inserted into an outer support housing (not shown) of a mirror 7 and of a source of light 8. The source of light 8 receives electric current from the electrical system of the car, the path or course of the electrical wires not being shown in detail but being known to the art.

In the embodiment shown in FIG. 1, there is a large distance between the source of light 8 and the mirror 7 in use, because the mirror 7 is arranged to be swung downward in the region of the lower longitudinal edge of the sun visor body 1. The mirror surface is hidden from the sight of the viewer when the mirror 7 is in its upward swung position of non-use, shown in solid lines. The mirror is accessible to the sight of the viewer when the mirror 7 is in its downward swung position of use, shown in dot-dash lines. For swingably attaching the mirror 7, a flexible band 10 can be used. The band is fastened on one side to the rear of the mirror, namely in the region of its lower longitudinal edge, and on the other side to the lower longitudinal edge region of the sun-visor body 1, for instance by bonding or welding. The mirror 7 is held in its upward swung position of non-use by cooperating clips, snap buttons or magnets 11 on the sun visor body 1. Swinging down of the mirror 7 is facilitated by a grip trough 12 developed in the sun visor body 1 which provides access to the mirror.

The embodiment of FIG. 2 shows a sun visor body 1 having a mirror 7 and a source of light 8. The mirror 7 is fastened to one side of a cover 13. The source of light 8 is located in the region of the lower longitudinal edge 9 of the sun visor body 1, referring to the position of use of the sun visor body 1. The cover 13 is developed with small support arms 14, and the cover is pivoted by these arms directly to the sun visor shaft 4. Slits 15 are provided in the sun visor body and they open toward the edge for permitting the swinging of the support arms 14. The cover 13 may consist, for instance, of a plastic injection molding, and may be developed integral with the support arms 14. The cover 13 carries the mirror 7 on the side of the cover facing the sun visor body 1. The mirror may be fastened to the cover 13 by clamps or the like, but is preferably fastened by bonding. The pivot side longitudinal edge of the cover 13 is rounded at 17 and this rounding extends around the upper longitudinal edge 2 of the sun visor body 1 and covers the slits 15. The other free longitudinal edge of the cover 13 is also rounded at 17 which can be clipped over the lower longitudinal edge 9 of the sun visor body 1, when the cover is in the position indicated in dot-dash line.

The sun visor body 1 of FIG. 2 has a recess 18 which is adapted to the dimensions of the mirror 7. The mirror 7 is contained in this recess when the cover 13 is closed.

The source of light 8 may comprise an incandescent tube. It is seated in a recess 19 in the sun visor body 1. The length of that recess is shorter than the length of the cover 13 so that when the cover 13 is clipped onto the longitudinal edge 9 of the sun visor body 1, there is no damage to the source of light 8.

FIG. 2 shows the sun visor body 1 in its position of non-use below the roof of a car. In order to place the mirror 7 in use, the cover 13 is merely detached from its clip mounting and is swung downward, as shown in solid line. The mirror 7 then lies opposite the eyes of the viewer in an approximately horizontal direction of viewing, as indicated by the eye 20 indicated in FIG. 2. The source of light 8 is located above the eyes 20 of the observer. This arrangement assures sufficient illumination of the face of the viewer, while it excludes or at least substantially reduces dazzling of the viewer. It is also possible to screen the source of light 8 off, if necessary, in separate regions from the eyes 20. For this purpose, a screen (not shown) can be mounted displaceably or swingably on the sun visor body 1. In one special measure, upon swinging down of the cover 13, an electric contact is closed and the source of light 8 is thus automatically turned on. Furthermore, the cover 13 may be automatically closed, for instance by a spring pull, when the sun visor body 1 is swung into its anti-dazzle position.

The embodiment shown in FIG. 3 also includes a cover 13 which is pivoted to the sun visor body 1 but which, in contrast to the embodiment shown in FIG. 2, is pivotally attached at the wide side of the sun visor body 1 which faces away from the windshield. The cover 13 is connected to the sun visor 1 by a plug pin 21. The cover is in a recess 18 in the sun visor body 1. The source of light 8 is also arranged within this recess. To enable the mirror 7, which is arranged on the cover 13, to be viewed, the sun visor body 1 is first swung downward around the sun visor shaft 4, for instance into the oblique position shown in the drawing. Then the cover 13 is loosened from a clip mounting which is preferably provided and is also swung downward so that the mirror on the cover can then be viewed unimpeded. Preferably, the downward swinging of the cover simultaneously turns on the source of light 8. In the embodiment of FIG. 3, it is also advantageous for the cover to be connected with a spring pull, or the like, by which it is automatically closed upon the swinging up of the sun visor body 1.

FIG. 4 shows a sun visor embodiment which is similar to the embodiment of FIG. 3. The mirror 7 is arranged on the back of the cover 13. Viewing into the mirror is in this case also made possible by merely swinging the cover 13 down, to the dot-dash line position. The cover 13 is developed like the cover of FIG. 3. The sun visor body 1 has a stepped recess 18. The first shallower step receives the mirror 7 and the second deeper step receives, for instance, several sources of light 8.

Figure 5:
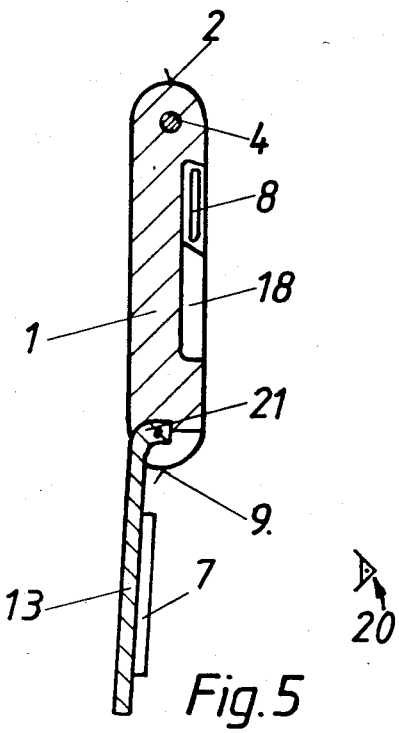

The embodiment shown in FIG. 5 affords a particularly great distance between the mirror 7 and the souce of light 8. This embodiment is substantially comparable to that of FIG. 1. In the region of the lower lengthwise edge 9 of the sun visor body 1, a cover 13 is pivotally attached by means of a plug pin 21. The mirror 7 is arranged on the back of the cover 13. The source of light 8 is seated in a recess 18 in the sun visor body 1, close to the upper longitudinal edge 2 of the body. The recess 18 serves also to receive the mirror 7 when the mirror is in its upward-swung position, and the recess may also have a developement which permits flush reception of the cover 13. The position of a viewer's eye 20, which is indicated in FIG. 5, shows that with this embodiment of the sun visor, there can normally be no dazzle by the source of light 8 since the light source is outside the field of view of the person looking into the mirror 7.

Figure 6:
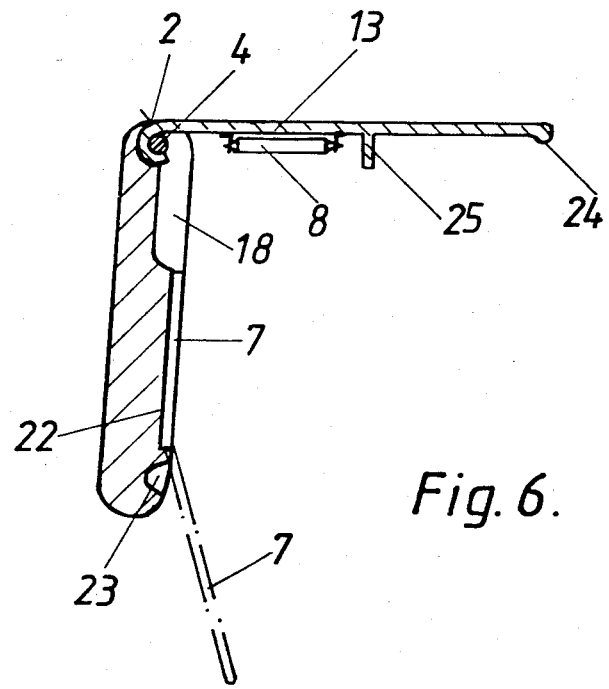

The sun visor body 1 of FIG. 6 has a cutout 22 with a mirror 7 inserted firmly in it by being clipped or bonded therein and the body has a recess 18 to receive the source of light 8 which in this case is arranged on the facing surface of a cover 13. The cover 13 is pivoted to the sun visor shaft 4 and the cover includes detent elements by which it is held in the open position shown. In its downwardly swung, closed position the cover 13 is held by a closure detent 24 which can be introduced into a correspondingly placed recess 23 in the sun visor body 1. In this embodiment, any dazzling caused by the source of light 8 can be effectively prevented by an anti-dazzle strip 25 which is arranged between the eyes of the viewer and the source of light 8 on the cover 13. If desired, the strip 25 can be vertically adjustable.

Figure 7:
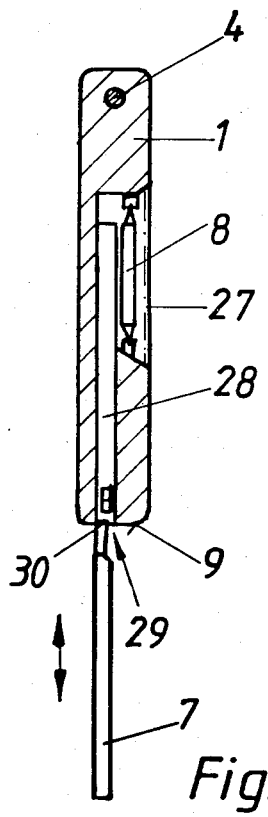

The dot-dash showing of the mirror 7 in FIG. 7 shows that it can be arranged in a downwardly swingable manner on the sun visor body 1, for instance, in the manner explained with reference to FIG. 1 or FIG. 3. By the upward swinging of the cover 13 which carries the source of light 8 and by the downward swinging of the mirror 7, a particularly large distance separation is obtained between source of light 8 and mirror 7.

FIG. 7 shows another embodiment of the invention including a mirror 7 which is mounted in the sun visor body 1 in such a manner that it can be pulled out of that body. In this case, the source of light 8 is arranged in a recess 18 in the upper region of the sun visor body 1 adjacent the sun visor shaft 4 and the light source is possibly covered by a lamp glass 27, indicated in dot-dash line. In order to place the mirror 7 into use, it is merely pulled out from a magazine-like receiver 28 provided within the sun visor body 1. Accordingly, the receiver 28 has a slot 29 located at the lower lengthwise edge 9 of the sun visor body 1.

The mirror 7 is held within the receiver 28 by at least one spring 30, which may be developed as a bow spring and which acts on a longitudinal edge. By means of the spring 30, an electric contact for the source of light 8 can also be actuated. The contact would respond, for instance, to the release of the pressure of the spring.

The mirror 7 may be supported by a transverse bar of a length greater than the length of the slot 29, so that the mirror 7 is secured against dropping out of the receiver 28.

Although the present invention has been described in connection with a number of preferred embodiments, many variations and modifications will now become apparent to those skilled in the art. It is preferred, therefore, that the present invention be limited not by the specific disclosure herein, but only by the appended claims.

What is claimed is:

1. A sun visor for an automotive vehicle, the visor comprising:

a sun visor body, a mirror supported by the body and a source of light also supported by the body; the mirror and the source of light having respective non-use positions, wherein they are relatively closer to each other; the mirror and the source of light also having respective use positions, wherein they are relatively more distant apart, and at their use positions, a viewer may view the mirror and the source of light is in position to illuminate the object being viewed; the mirror and the source of light being movable relative to each other, movement from their non-use to their use positions involving moving them relatively away from each other; the light source being located above the mirror in their use positions.

2. The sun visor of claim 1, wherein the movement of the mirror and the source of light to their respective use positions comprises moving the mirror away from the light source.

3. The sun visor of claim 1, wherein the sun visor body has a windshield facing, wide side which is adapted for facing a vehicle windshield in the position of use of the sun visor, the mirror being swingably supported to the windshield facing side of the visor body.

4. The sun visor of claim 1, wherein the sun visor body has a windshield facing, wide side which is adapted for facing a vehicle windshield in the position of use of the sun visor and the sun visor body has an opposite wide side opposite the windshield facing side, the mirror being swingably supported to the opposite side of the visor body.

5. The sun visor of claim 4, further comprising a cover swingably mounted on the visor body, and the mirror being mounted to the cover for thereby being swingably mounted to the visor body; the visor having a recess to receive the mirror and to receive the cover to which the mirror is mounted.

6. The sun visor of claim 5, wherein the visor body has opposite longitudinal edges, a bearing shaft connected with the visor body at one of the longitudinal edges of the body, and the cover has an axis of swing which coincides with the bearing shaft.

7. The sun visor of claim 5, wherein the visor body has opposite longitudinal edges, a bearing shaft connected with the visor body at one of the longitudinal edges of the body, and the mirror being swingably mounted to the visor body at the longitudinal edge opposite to the one longitudinal edge thereof.

8. The sun visor of claim 1, wherein the visor body has opposite longitudinal edges, a bearing shaft connected with the visor body at one of the longitudinal edges of the body, and the mirror has an axis of swing which coincides with the bearing shaft.

9. The sun visor of claim 4, wherein the sun visor body has a recess in it for receiving the mirror, and the body has a lower longitudinal edge with a slot opening in it for providing access to the recess in the visor body; the mirror being mounted in the recess in its non-use position and the mirror being drawn out of the slot opening as the mirror is moved to its use position.

10. The sun visor of claim 1, wherein movement of the mirror and the source of light to their use positions comprises moving the light source away from the mirror.

11. The sun visor of claim 10, wherein the source of light is mounted to the sun visor body such that the source of light is swingable around the body away from the mirror.

12. The sun visor of claim 11, further comprising a cover swingably mounted to the sun visor body, and the source of light being fastened to the cover for the source of light to thereby be swingable with respect to the visor body.

13. The sun visor of claim 12, wherein the sun visor body has a recess therein in which the source of light is received.

14. The sun visor of claim 11, further comprising an electric switch connected with the source of light for turning on the source of light when the source of light is swung away from the mirror.

15. The sun visor of claim 1, wherein the sun visor body has a recess therein in which the source of light is received.

16. The sun visor of claim 1, further comprising an electric switch connected with the source of light for turning on the source of light when the source of light and the mirror are in their respective use positions.

* * * * *